United States Patent
Khojastepour et al.

(10) Patent No.: US 11,909,479 B2
(45) Date of Patent: Feb. 20, 2024

(54) SHAPING MMWAVE WIRELESS CHANNEL VIA MULTI-BEAM DESIGN USING RECONFIGURABLE INTELLIGENT SURFACES

(71) Applicant: NEC Laboratories America, Inc., Princeton, NJ (US)

(72) Inventors: Mohammad Khojastepour, Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/863,720

(22) Filed: Jul. 13, 2022

(65) Prior Publication Data
US 2023/0043800 A1   Feb. 9, 2023

Related U.S. Application Data

(60) Provisional application No. 63/221,868, filed on Jul. 14, 2021.

(51) Int. Cl.
| | |
|---|---|
| *H04B 7/06* | (2006.01) |
| *H04B 7/10* | (2017.01) |
| *H04B 7/155* | (2006.01) |

(52) U.S. Cl.
CPC .............. *H04B 7/0617* (2013.01); *H04B 7/10* (2013.01); *H04B 7/15507* (2013.01)

(58) Field of Classification Search
CPC .... H04B 7/04013; H04B 7/0617; H04B 7/10; H04B 7/15507; H04B 7/15528
See application file for complete search history.

(56) References Cited

U.S. PATENT DOCUMENTS

| | | | |
|---|---|---|---|
| 2022/0059943 A1* | 2/2022 | Saab | H04B 7/0617 |
| 2022/0322321 A1* | 10/2022 | Dai | H04W 52/0206 |
| 2023/0179465 A1* | 6/2023 | Lee | H04B 7/022 |
| | | | 398/118 |

OTHER PUBLICATIONS

Björnson et al., "Reconfigurable Intelligent Surfaces: A Signal Processing Perspective With Wireless Applications", arXiv:2102.00742v2 [eess.SP], Dec. 31, 2021, pp. 1-43.

(Continued)

*Primary Examiner* — David S Huang
(74) *Attorney, Agent, or Firm* — Joseph Kolodka (57) ABSTRACT

A method for shaping a mmWave wireless channel in a wireless network is presented. The method includes enabling communication between a multi-antenna transmitter and a multi-antenna receiver, positioning a reconfigurable intelligent surface (RIS) in a vicinity of the multi-antenna transmitter and the multi-antenna receiver, constructing the RIS as a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, and enabling the plurality of users of the plurality of mobile devices positioned in blind spots of a coverage map to communicate with the multi-antenna transmitter by employing the MS to generate sharp and effective beams having almost uniform gain in a desired angular coverage interval (ACI).

20 Claims, 5 Drawing Sheets

(56) References Cited

OTHER PUBLICATIONS

Huang et al., "Reconfigurable Intelligent Surfaces for Energy Efficiency in Wireless Communication", IEEE Transactions on Wireless Communications, vol. 18, No. 8, Aug. 2019, pp. 4157-4170.
Basar et al., "Wireless Communications Through Reconfigurable Intelligent Surfaces", IEEE access, Aug. 13, 2019, pp. 116753-116773.

* cited by examiner

SHAPING MMWAVE WIRELESS CHANNEL VIA MULTI-BEAM DESIGN USING RECONFIGURABLE INTELLIGENT SURFACES

RELATED APPLICATION INFORMATION

This application claims priority to Provisional Application No. 63/221,868 filed on Jul. 14, 2021, the contents of which are incorporated herein by reference in their entirety.

BACKGROUND

Technical Field

The present invention relates to Millimeter wave (mmWave) communications and, more particularly, to shaping a mmWave wireless channel via a multi-beam design by using a reconfigurable intelligent surface (RIS).

Description of the Related Art

Millimeter wave (mmWave) communications are considered a key enabler toward the realization of next generation wireless networks, due to the abundance of unused spectrum at mmWave frequencies. However, mmWave suffers from high free-space path-loss and poor scattering resulting in mostly line-of-sight (LoS) channels, and lack of coverage. In addition to beamforming, relaying can generate constructive superposition and enhance the received signals for the users. Reconfigurable intelligent surfaces (RISs), as a new paradigm, have the potential to stretch the coverage of next-generation networks by shaping the mmWave wireless channel.

SUMMARY

A method for shaping a millimeter wave (mmWave) wireless channel in a wireless network is presented. The method includes enabling communication between a multi-antenna transmitter and a multi-antenna receiver, the multi-antenna receiver being a plurality of mobile devices of a plurality of users, positioning a reconfigurable intelligent surface (RIS) in a vicinity of the multi-antenna transmitter and the multi-antenna receiver, the RIS reflecting signals received from the multi-antenna transmitter toward the multi-antenna receiver, constructing the RIS as a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, and enabling the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

A non-transitory computer-readable storage medium comprising a computer-readable program for shaping a millimeter wave (mmWave) wireless channel in a wireless network is presented. The computer-readable program when executed on a computer causes the computer to perform the steps of enabling communication between a multi-antenna transmitter and a multi-antenna receiver, the multi-antenna receiver being a plurality of mobile devices of a plurality of users, positioning a reconfigurable intelligent surface (RIS) in a vicinity of the multi-antenna transmitter and the multi-antenna receiver, the RIS reflecting signals received from the multi-antenna transmitter toward the multi-antenna receiver, constructing the RIS as a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, and enabling the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

A system for shaping a millimeter wave (mmWave) wireless channel in a wireless network is presented. The system includes a memory and one or more processors in communication with the memory configured to enable communication between a multi-antenna transmitter and a multi-antenna receiver, the multi-antenna receiver being a plurality of mobile devices of a plurality of users, position a reconfigurable intelligent surface (RIS) in a vicinity of the multi-antenna transmitter and the multi-antenna receiver, the RIS reflecting signals received from the multi-antenna transmitter toward the multi-antenna receiver, construct the RIS as a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, and enable the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The next generation of wireless communication systems aims to address the ever-increasing demand for high throughput, low latency, better quality of service and ubiquitous coverage. The abundance of bandwidth available at the mmWave frequency range is considered a key enabler toward the realization of the promises of next generation wireless communication systems. However, communication in mmWave suffers from high path-loss and poor scattering. Since the channel in mmWave is mostly line-of-sight (LoS), that is, strong LOS path and very few and much weaker secondary paths, the coverage map includes blind spots because of shadowing and blockage. Beamforming is primarily used to address the high attenuation in the channel. In addition to beamforming, relaying can potentially generate constructive superposition and enhance the received signals at the receiving nodes.

A reconfigurable intelligent surface (RIS) is a new paradigm that has great potential for stretching the coverage and enhancing the capacity of next-generation communication systems. Indeed, it is possible to shape the wireless channel by using RIS, e.g., by covering blind spots or providing diversity reception at a receiving node. In particular, passive RISs provide not only an energy-efficient solution but also a cost-effective solution both in terms of initial deployment as well as operational costs. RISs are promising for deployment in a wide range of communication scenarios, such as high throughput multiple input, multiple output (MIMO) communications, ad hoc networks, e.g., unmanned aerial vehicle (UAV) communications, physical layer security, etc. Apart from works focusing on theoretical performance analysis of RIS-enabled systems, considerable amount of work has been dedicated to optimizing such an integration, mostly focusing on phase optimization of RIS elements to achieve various goals such as maximum received signal strength, maximum spectral efficiency, etc.

The exemplary embodiments consider a communication scenario between a transmitter, e.g., a base station (BS), and users through a passive RIS that reflect the received signal from the transmitter toward the users. Hence, the users that are otherwise in blind spots can communicate with the BS when the RIS is serving as a passive reflector (passive relay) in between the communication link from the BS and the users. The exemplary methods particularly address the design of beams that have multiple disjoint lobes using RIS to cover different blind spots by utilizing sharp and effective beams.

The exemplary embodiments of the present invention design the parameters of RIS to achieve multiple disjoint beams that cover different solid angles. The designed beams are sharp, have almost uniform gain in the desired angular coverage interval (ACI), and have negligible power transmitted outside the ACI. The multi-beamforming design is formulated as an optimization problem for which an optimal solution is derived. Thanks to the analytical closed form solutions for the optimal multi-beamforming design, the proposed exemplary solution bears very low computational complexity even for a RIS with a massive array size.

The exemplary embodiments can be used with arrays that are passive (whether it is only phased-controlled or both phase—and gain controlled) as well as a RIS with active elements (that can amplify the reflected signal). The exemplary embodiments identify the fact that if a passive RIS can control the gain of its element (e.g., through attenuation), it can provide smoother gain in the desired ACI and boost the beamforming gain. The latter could be counterintuitive as the power radiated from every single element is not maximized due to attenuation, but in fact, to shape the beams, it is essential to use controlled attenuation for a signal reflected from different array elements of the RIS in the superposition of the signals emitted by each RIS element. The multi-beamforming design inherently depends on the solid angle (e.g., $\Omega_1$ in FIG. 2) at which the incident wave activates the RIS elements. The beamforming design easily adapts to changes in $\Omega_1$ and a visualization as how the beam would change in response to change in $\Omega_1$ is provided.

Figure 1:
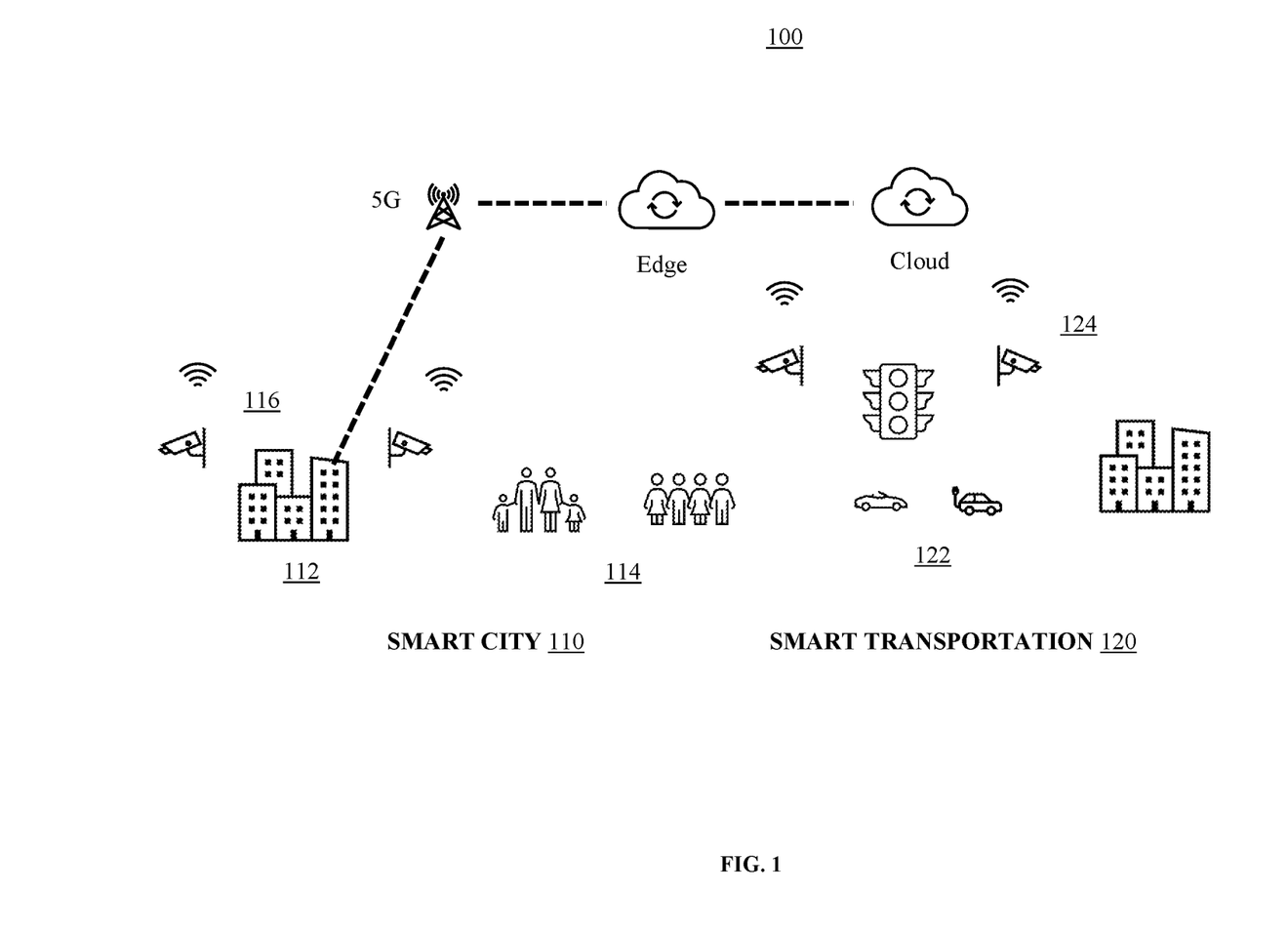
FIG. 1 is a block/flow diagram of an exemplary communication system.

FIG. 1 is a block/flow diagram of an exemplary communication system 100.

The physical infrastructure includes computing nodes distributed across multiple layers, at the edge and at a central cloud. The nodes can be a building 112, people 114, cars 122, etc., employed in a smart city 110 having smart transportation 120. Cameras communicate (116, 124) with the cloud and the edge to transmit data to the cloud via a 5G network.

Regarding the exemplary embodiments, $\mathbb{C}$, $\mathbb{R}$, and $\mathbb{Z}$ denote a set of complex, real, and integer numbers, respectively, $\mathcal{CN}(m, \sigma^2)$ denotes a circularly symmetric complex normal distribution with mean m and variance $\sigma^2$, [a, b] is a closed interval between a and b, $1_{a,b}$ is the a×b all ones matrix, $I_N$ is the N×N identity matrix, $\|\cdot\|_{[a,b)}$ is the indicator function, $\|\cdot\|$ is the 2-norm, $|\cdot|$ may denote cardinality if applied to a set and 1-norm if applied to a vector, $\odot$ is the Hadamard product, $\otimes$ is the Kronecker product, $A^H$ and $A_{a,b}$ denote conjugate transpose, and the $(a, b)^{th}$ entry of A, respectively.

Figure 2:
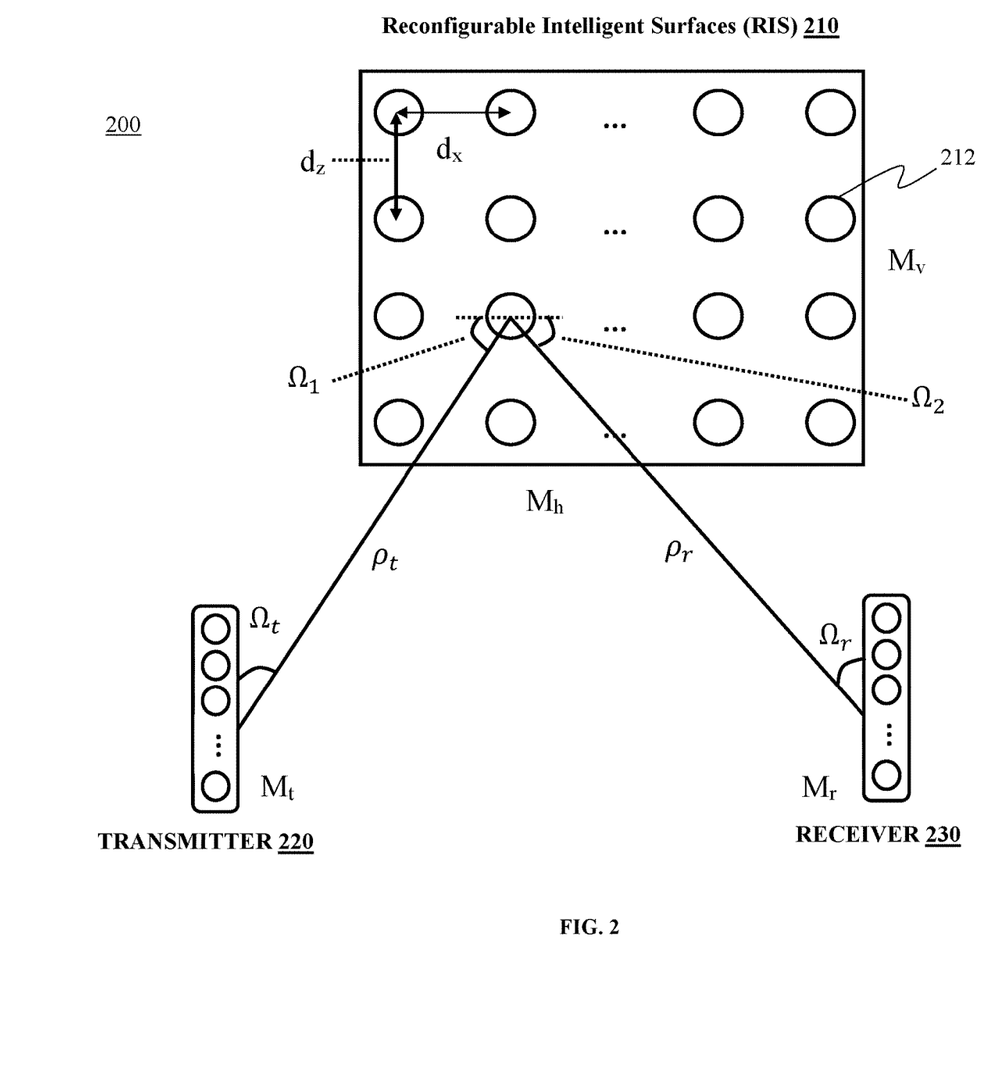
FIG. 2 is a block/flow diagram of exemplary reconfigurable intelligent surface (RIS) model, in accordance with embodiments of the present invention.

In FIG. 2, a communication system 200 is considered including a multi-antenna BS with $M_t$ antenna elements as a transmitter 220 and a multi-antenna receiver 230 with $M_r$ antenna elements. The MIMO system is aided by a multi-element RIS 210 including M elements 212 arranged in an $M_h \times M_v$ grid in the form of a Uniform Planar Array (UPA), where $M_h$ and $M_v$ are the number of elements in the horizontal and vertical directions, respectively. The received signal $y \in \mathbb{C}^{M_r}$ as a function of the transmitted signal $x \in \mathbb{C}^{M_t}$ can be written as:

$$y = (H_r \Theta H_t)x + z \tag{1}$$

where z is the noise vector, with each element of z drawn from a complex Gaussian distribution $\mathcal{CN}(0, \sigma_n^2)$, and $H_t \in \mathbb{C}^{M \times M_t}$ and $H_r \in \mathbb{C}^{M_r \times M}$ are the channel matrices between each party and the RIS.

It is assumed that the RIS includes elements for which both the phase $\theta_m$ and the gain $\beta_m$. (in the form of attenuation of the reflected signal) of each element, say m, may be controlled and $\Theta \in \mathbb{C}^{M \times M}$ is a diagonal matrix where the element (m, m) denotes the coefficient $\beta_m e^{j\theta_m}$ in of the $m^{th}$ element of the RIS. Assuming a LoS channel model both between the transmitter and the RIS and between the RIS and the receiver, and using the directivity vectors at the transmitter, the RIS, and the receiver, the effective channel matrices can be written as:

$$H_t = d_{M_t}\{\Omega_t\}\rho_t d_M^H\{\Omega_1\} \tag{2}$$

$$H_r = d_M\{\Omega_2\}\rho_r d_{M_r}^H\{\Omega_r\} \tag{3}$$

where $\Omega_t$ and $\Omega_2$ are the solid angle of departure (AoD) of the transmitted beams from the transmitter 220 and the RIS 210, and ill and D r are the solid angle of arrival (AoA) of the received beams at the RIS 210 and the receiver 230, respectively. The gain of the LoS paths from the transmitter 220 to the RIS 210, and from the RIS 210 to the receiver 230, are denoted by p i and $\rho_r$, respectively. It is noted that the solid angle $\Omega_a$ specifies a pair of elevation and azimuth angles e.g., $(\varphi_a, \theta_a)$, $a \in \{1, 2, t, r\}$. Further, assuming no pairing between the RIS elements 212, $\Theta$ will be a diagonal matrix specified as:

$$\Theta = \text{diag}\{[\beta_1 e^{j\Theta_1}, \ldots, \beta_M e^{j\Theta_M}]\} \quad (4)$$

where $\beta_i \in [0,1]$ and $\theta_i \in [0, 2\pi]$.

Regarding the RIS model, suppose the RIS 210 includes $M_h \times M_v$, antenna elements forming a UPA structure that is placed at the x-z plane, where $M = M_h M_v$ and the z axis corresponds to the horizon. Let dz, and dx denote the distance between the antenna elements 212 in z and x axes, respectively. For a given $M_a \in \mathbb{Z}$ and $\psi_a \in \mathbb{R}$, $a \in \{h, v\}$, the vector is defined as:

$$d_{M_a}(\psi_a) = [1, e^{j\psi_a} \ldots e^{j(M_a-1)\psi_a}]^T \in \mathbb{C}^{M_a} \quad (5)$$

The array response vector, that is, directivity vector, of the RIS 210 for a solid angle $\Omega$, i.e., $d_M\{\Omega\}$ as a function of and $\psi_v$ and $\psi_h$ is denoted by $d_M(\psi_v, \psi_h)$ and is given by:

$$d_M(\psi_v, \psi_h) = d_{M_v}(\psi_v) \otimes \mathbb{C}^M \quad (6)$$

where, $$\psi_h = \frac{2\pi d_x}{\lambda} \sin\theta \cos\phi$$

and $$\psi_v = \frac{2\pi d_z}{\lambda} \sin\phi$$

and for a solid angle $\Omega = (\phi, \psi)$.

Let B be the angular range under cover defined as:

$$\mathcal{B} = [-\phi^B, \phi^B) \times [-\theta^B, \theta^B) \quad (7)$$

It is noted that there is a one-to-one correspondence between the solid angle $\Omega = (\phi, \psi)$ and its representation after a change of variable as $(\psi_h, \psi_v)$.

Accordingly, let $B^\psi$ be the angular range under cover in the $(\psi_h, \psi_v)$ domain given by:

$$\mathcal{B}^\psi = [-\psi_v^B, \psi_v^B) \times (-\psi_h^B, \psi_h^B) \quad (8)$$

The exemplary methods set $$d_x = d_z = \frac{\lambda}{2}, \phi^B = \frac{\pi}{4}, \text{ and } \theta^B = \frac{\pi}{2},$$

hence $$\psi_v \in \left[-\pi\frac{\sqrt{2}}{2}, \pi\frac{\sqrt{2}}{2}\right), \text{ and } \psi_h \in [-\pi, \pi).$$

It is noted that the dependence between variables and $\psi_v$ and $\psi_h$ can be resolved using an approximation. B is uniformly divided into $Q = Q_v Q_h$ subregions, where $Q_h$ and $Q_v$ are the number of divisions in horizontal and vertical directions, respectively.

A subregion is denoted by $\mathcal{B}_{p,q}^\psi \doteq v_v^{p,q} \times v_h^{p,q}$.

The multi-beamforming design problem as the core of the proposed RIS structure is now defined. Prior to formulating the multi-beamforming design problem, a few preliminary definitions are presented. The multi-beam $\mathcal{D} = (\mathcal{D}_1, \ldots, \mathcal{D}_k)$ is defined as a collection of k compound beams $\mathcal{D}_i$, $i = 1, \ldots, k$ where $\mathcal{D}_i \subseteq \mathcal{B}^\psi$ and $\mathcal{B}_i = \bigcup_{(p,q) \in \mathcal{A}_i} \mathcal{B}_{p,q}^\psi$, with $\mathcal{A}_i$ being the set of all pairs (p, q) that all beams $\mathcal{B}_{p,q}^\psi$ cover $\mathcal{D}_i$. The union of $\mathcal{B}_{p,q}^\psi$ is in fact approximating the shape of the solid angle for the desired compound beam corresponding to $\mathcal{D}_i$. By using a larger number of divisions, that is, finer beams, the approximation can be made better. Thus:

$$\mathcal{A}_i = \arg\min |\hat{\mathcal{A}}| \quad (9)$$

$$\left\{ \hat{\mathcal{A}} \,\middle|\, \mathcal{D}_i \subseteq \bigcup_{(p,q) \in \hat{\mathcal{A}}} \mathcal{B}_{p,q} \right\}$$

$\mathcal{A}$ is further defined as: $\mathcal{A} = \bigcup_{i=1}^k \mathcal{A}_i$.

The exemplary embodiments aim to design a beamforming vector c such that the multibeam $\mathcal{D}$ is covered given that the RIS array is excited by an incident wave received at a given solid angle $\Omega_1$. By using equations (1)-(3) above, the contribution of the RIS 210 in the channel matrix for a receiver 230 at the solid angle $\Omega_2$ is given by:

$$\Gamma = d_M^H\{\Omega_1\} \Theta d_M\{\Omega_2\} = \Lambda d_M\{\Omega_2\} \quad (10)$$

where $\Lambda = d_M^H\{\Omega_1\} \Theta$.

Let $c = \text{diag}(\Lambda^H)$ denote a vector of length M including the diagonal elements of the matrix $\Lambda^H$. For an antenna element located at $(m_v, m_h)$ in the UPA grid, $$c_{m_v, m_h} = \beta_{m_v, m_h} e^{-j(\theta_{m_v, m_h} - m_v \psi_{v,1} - m_h \psi_{h,1})},$$

$$m_v = 0, \ldots, M_v - 1, m_h = 0, \ldots, M_h - 1,$$

where $(\psi_{v,1}, \psi_{h,1})$ is the representation of $\Omega_1$ in the $(\psi_v, \psi_h)$ domain, and hence the vector c is given by:

$$c = [c_{0,0}, \ldots, c_{0, M_h-1}, c_{1,0}, \ldots, c_{M_v-1, M_h-1}] \quad (11)$$

It is noted that by defining the beamforming vector c as above, the reference gain in direction $(\psi_h, \psi_v)$ is given by:

$$G(\psi_v, \psi_h, c) = |(d_{M_v}(\psi_v) \otimes d_{M_h}(\psi_h))^H c|^2 \quad (12)$$

Thus, by designing the beamforming vector c, the exemplary embodiments can simply find the values of the phase shift $\theta_k$ and the attenuation value $\beta_k$ for the $k^{th}$ elements of the RIS by using the corresponding beamforming coefficient C k and the value of the $k^{th}$ element of the directivity vector $d_M\{\Omega_1\}$ for any receive incident solid angle $\Omega_1$.

It is further noted that in the equation of the reference gain, d and c are both normalized with respect to the maximum values of the gain to be one. This means that the norm of every element of the directivity vector d is one. Also, the gain of every element of the beamforming coefficient is also less than or equal to one since the RIS 210 is assumed to be passive.

For any beamforming vector c, it is straightforward to show that:

$$\int_{-\pi}^{\pi} \int_{-\pi}^{\pi} G(\psi_v, \psi_h, c) d\psi_v d\psi_h = (2\pi)^2 \quad (13)$$

The exemplary embodiments design beamformers that provide high, sharp, and constant gain within the desired ACI's and zero gain everywhere else.

The ideal gain corresponding to such beamformer c is given by:

$$\int\int_{\mathcal{B}^\psi} G_{ideal, \mathcal{D}}(\psi_v, \psi_h) d\psi_v d\psi_h = \sum_{i=1}^k \int\int_{\mathcal{D}_i} t d\psi_v d\psi_h = \quad (14)$$

-continued $$\sum_{(p,q)\in\mathcal{A}} \int\int_{\mathcal{B}^{\psi}_{p,q}} t d\psi_v d\psi_h = \sum_{(p,q)\in\mathcal{A}} \delta_{p,q} t = (2\pi)^2$$

where $\delta_{p,q}$ denotes the area of the (p, q)-th beam in the $(\psi_v, \psi_h)$ domain.

Therefore, t can be derived as:

$$t = \frac{(2\pi)^2}{|\mathcal{A}|\delta_{p,q}}.$$

It holds that:

$$G_{\mathcal{D}}^{ideal}(\psi_v, \psi_h) = \frac{(2\pi)^2}{|\mathcal{A}|\delta_{p,q}} 1_{\mathcal{D}}(\psi_v, \psi_h) \quad (15)$$

Using the beamformer c, the deal gain in equation (15) is mimicked.

Therefore, the following optimization problem is formulated:

$$c_{\mathcal{D}}^{opt} = \arg\min_{c, \|c\|=1} \int\int_{\mathcal{B}^{\psi}} |G_{\mathcal{D}}^{ideal}(\psi_v, \psi_h) - G(\psi_v, \psi_h, c)| d\psi_v d\psi_h \quad (16)$$

By partitioning the range of $(\psi_v, \psi_h)$ into the pre-defined intervals, and then uniformly sampling with a rate $(L_v, L_h)$ per interval along both axes, the optimization problem can be written as follows:

$$c_{\mathcal{D}}^{opt} = \arg\min_{c, \|c\|=1} \sum_{r=1}^{Q_v} \sum_{s=1}^{Q_h} \int\int_{\mathcal{B}^{\psi}_{r,s}} |G_{\mathcal{D}}^{ideal}(\psi_v, \psi_h) - G(\psi_v, \psi_h, c)| d\psi_v d\psi_h$$

$$= \lim_{L_h, L_v \to \infty} \sum_{r=1}^{Q_v} \sum_{s=1}^{Q_h} \sum_{l_v=1}^{L_v} \sum_{l_h=1}^{L_h} \frac{\delta_v \delta_h}{L_h L_v} \quad (17)$$

$$|G_{\mathcal{D}}^{ideal}(\psi_v^{r,s}[l_v], \psi_h^{r,s}[l_h]) - G(\psi_v^{r,s}[l_v], \psi_h^{r,s}[l_h], c)|$$

where $$\psi_v^{r,s} = \psi_v^B + r\delta_v \quad (18)$$

$$\psi_h^{r,s} = \psi_h^B + s\delta_h \quad (19)$$

$$\psi_v^{r,s}[l_v] = \psi_v^{r-1,s} + l_v \frac{\delta_v}{L_v}$$

$$\psi_h^{r,s}[l_h] = \psi_h^{r,s-1} + l_h \frac{\delta_h}{L_h} \quad (20)$$

with $\delta_a = \frac{2\psi_a^B}{Q_a}$, for $a \in \{v, h\}$.

Note that it holds for all (p, q) pairs that, $\delta_{p,q} = \delta_v \delta_h$.
Equation (17) can be rewritten as:

$$c_{\mathcal{D}}^{opt} = \text{argmin}_{c, \|c\|=1} \lim_{L_h, L_v \to \infty} \frac{1}{L_h L_v} |G_{\mathcal{D}}^{ideal} - G(c)| \quad (21)$$

where $$G(c) = \delta_v \delta_h \left[ G(\psi_v^1[1], \psi_h^1[1], c) \ldots G(\psi_v^{Q_v}[L_v], \psi_h^{Q_h}[L_h], c) \right]^T \quad (24)$$

and $$G_{\mathcal{D}}^{ideal} = \delta_v \delta_h \left[ G_{\mathcal{D}}^{ideal}(\psi_v^1[1], \psi_h^1[1]) \ldots G_{\mathcal{D}}^{ideal}(\psi_v^{Q_v}[L_v], \psi_h^{Q_h}[L_h]) \right]^T \quad (23)$$

Unfortunately, the optimization problem in (21) does not admit an optimal closed-form solution as is, due to the absolute values of the complex numbers existing in the formulation.

However, it is noted that:

$$G_{\mathcal{D}}^{ideal} = \sum_{(p,q)\in\mathcal{A}} \delta_{p,q} \frac{(2\pi)^2}{|\mathcal{A}|\delta_{p,q}} (e_{p,q} \otimes 1_{L,1}) = \frac{(2\pi)^2}{|\mathcal{A}|} \sum_{(p,q)\in\mathcal{A}} e_{p,q} \otimes 1_{L,1} \quad (24)$$

with $e_{p,q} \in \mathbb{Z}^Q$ being the standard basis vector for the (p,q)-th axis among $(Q_v, Q_h)$ pairs. Now, it is noted that $1_{L,1} = g \odot g^*$ for any equal gain $g \in \mathbb{C}^L$, where $L = L_h L_v$.

An equal-gain gain vector $g \in \mathbb{C}^L$ is one all elements of which have a similar gain (in this case, equal to 1) and only very in their phase. Therefore, $G\mathcal{D}^{ideal}$ can be written as:

$$G_{\mathcal{D}}^{ideal} = \sum_{(p,q)\in\mathcal{A}} \frac{2(\pi)^2}{|\mathcal{A}|} (e_{p,q} \otimes (g \odot g^*)) \quad (25)$$

$$= \frac{2(\pi)^2}{|\mathcal{A}|} \sum_{(p,q)\in\mathcal{A}} (e_{p,q} \otimes g) \odot (e_{p,q} \otimes g)^*$$

$$= \left( \sum_{(p,q)\in\mathcal{A}} \frac{2\pi}{\sqrt{|\mathcal{A}|}} (e_{p,q} \otimes g) \right)^*$$

$$\odot \sum_{(p,q)\in\mathcal{A}} \frac{2\pi}{\sqrt{|\mathcal{A}|}} (e_{p,q} \otimes g)$$

Also, it is straightforward to write:

$$G(c) = (D^H c) \odot (D^H c)^* \quad (26)$$

where $D^H = \sqrt{\delta_v \delta_h} (D_v^H \otimes D_h^H)$, and for $\alpha \in \{v, h\}$, and $b = 1 \ldots Q_\alpha$, and:

$$D_a = [D_{a,1}, \ldots, D_{a,Q_a}] \in \mathbb{C}^{M_a \times L_a Q_a} \quad (27)$$

$$D_{a,b} = [d_{M_a}(\psi_a^b[1]), \ldots, d_{M_a}(\psi_a^b[L_a])] \in \mathbb{C}^{M_a \times L_a} \quad (28)$$

Comparing the expressions (21), (25), and (26), the optimal choice of $c\mathcal{D}$ in (16) can be shown to be the solution to the following optimization problem for proper choices of $g_{p,q}$.

Regarding Problem 1, given equal-gain vectors $g_{p,q} \in \mathcal{D}^L$, for $(p, q) \in \mathcal{A}$, vector $c\mathcal{D} \in \mathbb{C}^M$ is found such that:

$$c_{\mathcal{D}} = \arg\min_{c, \|c\|=1} \lim_{L \to \infty} \left\| \sum_{(p,q)\in\mathcal{A}} \frac{2\pi}{\sqrt{|\mathcal{A}|}} (e_{p,q} \otimes g_{p,q}) - D^H c \right\|^2 \quad (29)$$

However, the optimal choices of $g_{p,q}$ that minimize the objective in (21) need to be found.

Using equations (25), and (26), the following optimization problem is provided: Regarding Problem 2, equal-gain vectors $g_{p,q} \in \mathbb{C}^L$, $(p, q) \in \mathcal{A}$ are found such that:

$$\langle g^*_{p,q} \rangle_{(p,q)\in \mathcal{A}} = \tag{30}$$

$$\underset{\{g_{p,q}\}_{(p,q)\in\mathcal{A}}}{\arg\min} \left\| bs(D^H c_{\mathcal{D}}) - \frac{2\pi}{\sqrt{|\mathcal{A}|}} \text{abs}\left( \sum_{(p,q)\in\mathcal{A}} e_{p,q} \otimes g_{p,q} \right) \right\|^2$$

where abs(.) denotes the element-wise absolute value of a vector.

In the next section the exemplary methods continue with the solution of Problems 1 and 2. It is noted that the solution to Problem 1 is the limit of the sequence of solutions to a least-square optimization problem as L goes to infinity.

For each L:

$$c_{\mathcal{D}}^{(L)} = \sum_{(p,q)\in\mathcal{A}} \frac{2\pi}{\sqrt{\text{Card}(\mathcal{A})}} (DD^H)^{-1} D(e_{p,q} \otimes g_{p,q}) \tag{31}$$

$$c_{\mathcal{D}}^{(L)} = \sum_{(p,q)\in\mathcal{A}} \sigma D_{p,q} g_{p,q}$$

where $\tag{32}$ $$\sigma = \frac{2\pi\sqrt{\delta_v \delta_h}}{LQ\delta_v\delta_h\sqrt{\text{Card}(\mathcal{A})}} = \frac{2\pi}{LQ\sqrt{\delta_v\delta_h}\ \text{Card}(\mathcal{A})}$$

Further, it holds that:

$$DD^H = \delta_v \delta_h (D_v \otimes D_h (D_v^H \otimes D_h^H) = \delta_v \delta_h LQ \tag{33}$$

To solve the Problem 2, the following Proposition is presented:

Regarding the Proposition, the minimizer of (30) is in the form of:

$$g^*_{p,q} = [1 a^n \ldots a_v^{n(l_v-1)} a_h^{n(l_v-1)}]^T, (p,q) \in \mathcal{A}$$

for some η where $$\alpha_a = e^{j\left(\frac{\eta a}{L_a}\right)}, a \in \{v, h\}.$$

Therefore, an analytical closed form solution for $c\mathcal{D}$ can be found as follows:

$$c_{\mathcal{D}}^{(L)} = \sigma \sum_{(p,q)\in\mathcal{A}} \left( \sum_{(l_v,l_h)=(1,1)}^{(L_v,L_h)} g_{p,q,l} d_{M_l}(\psi_v^p[l_v], \psi_h^q[l_h]) \right) \tag{34}$$

$$= \sigma \sum_{(p,q)\in\mathcal{A}} \left( \sum_{l=1}^{L} g_{q,p,l} [1 \ \ldots \ e^{j\phi_{p,q}^{M_v-1,M_h-1}}]^T \right)$$

where $\phi_{p,q}^{m_v,m_h} = (m_v \psi_v^p[l_v] + m_h \psi_h^q[l_n])$.

The $(m_v, m_h)^{th}$ component of the beamformer c v can be written as:

$$c_{p,q,m_v,m_h} = \lim_{L_h,L_v \to \infty} \frac{1}{L_h L_v} \sum_{(p,q)\in\mathcal{A}} \sum_{(l_v,l_h)=(1,1)}^{(L_v,L_h)} g_{p,q,l_v,l_h} e^{j\phi_{p,q}^{M_v-1,M_h-1}} \tag{35}$$

$$c_{p,q,m_v,m_h} = \tag{36}$$

$$\lim_{L_h,L_v \to \infty} \frac{1}{L_h L_v} \sum_{(l_v,l_h)=(1,1)}^{(L_v,L_h)} g_{p,q,l_v,l_h} e^{j\left(m_v\left(\psi_v^{p-1}+l_v\frac{\delta_v}{L_v}\right)+m_h\left(\psi_h^{q-1}+l_h\frac{\delta_h}{L_h}\right)\right)}$$

$$c_{p,q,m_v,m_h} = \frac{2\pi}{Q} e^{j\phi_{p-1,q-1}^{m_v,m_h}} \left( \frac{1}{L_v} \lim_{L_v \to \infty} \sum_{l_v=1}^{L_v} e^{j\frac{l_{l_v}+m_v\delta_v}{L_v}l_v} \right) \tag{37}$$

$$\left( \frac{1}{L_v} \lim_{L_h \to \infty} \sum_{l_h=1}^{L_h} e^{j\frac{\eta_h+m_h\delta_h}{L_h}l_h} \right)$$

$$c_{\mathcal{D},m_v,m_h} = \sum_{(p,q)\in\mathcal{A}} \frac{2\pi}{Q} e^{j\phi_{p-1,q-1}^{m_v,m_h}} \int_0^1 e^{j\xi_v x} dx \int_0^1 e^{j\xi_h x} dx =$$

$$\sum_{(p,q)\in\mathcal{A}} \frac{2\pi}{Q} e^{j\left(\theta_{p-1,q-1}^{m_v,m_h} + \frac{\xi_v+\xi_h}{2}\right)} \text{sinc}\left(\frac{\xi_v}{2\pi}\right) \text{sinc}\left(\frac{\xi_v}{2\pi}\right)$$

with $\theta_{p,q}^{m_v,m_h} = (m_v \psi_v^p + m_h \psi_h^q), \xi_a = \delta_a m_a + \eta_a, a \in \{v, h\}.$ (38)

where equation (38) shows the configuration of the RIS element at $(m_v, m_h)$ when $c\mathcal{D}$ is normalized such that the maximum gain among the elements is equal to one, given that both phase control and gain control at the passive RIS is allowed. Under the condition that controlling the gains of the RIS elements is not feasible, the exemplary methods only take $c\mathcal{D}$, $m_v$, $m_h$ as the beamformer configuration. Under the active mode, the gains of each RIS element can be amplified.

In conclusion, the exemplary embodiments introduce a novel architecture for designing RIS by using a uniform planar array (UPA) structure as the bulk of the RIS. The core of the development is a multi-beamforming framework that makes covering any desired angular region possible with high gain, stable, and sharp beams while avoiding power leakage to other regions.

Figure 3:
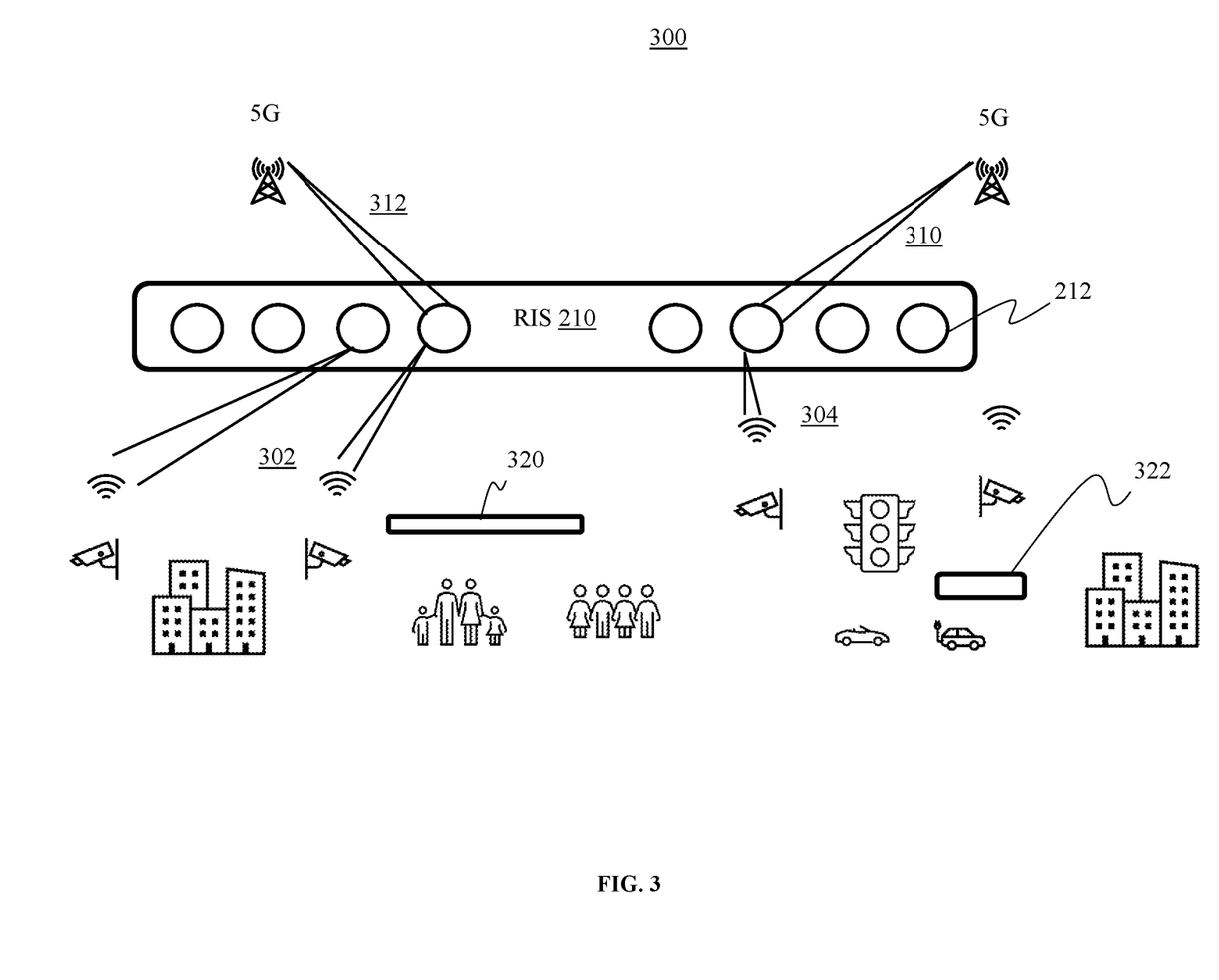
FIG. 3 is an exemplary practical application for shaping a millimeter wave (mmWave) wireless channel in a wireless network, in accordance with embodiments of the present invention.

FIG. 3 is an exemplary practical application 300 for shaping a millimeter wave (mmWave) wireless channel in a wireless network, in accordance with embodiments of the present invention.

In one practical example, a plurality of receivers communicate with the transmitters or base stations via the RIS 210. The plurality of receivers, that is, mobile devices of users transmit signals 302, 304 to the elements 212 of the RIS 210. The transmitters communicate 310, 312 with the RIS 210 to receive the signals 302, 304. Even though the users may be in blind spots 320, 322, the users can still communicate with the BS or 5G networks when the RIS 210 serves as a passive reflector between the communication link from the BS and the users. The RIS provides for sharp and effective beams to cover different blind spots.

Figure 4:
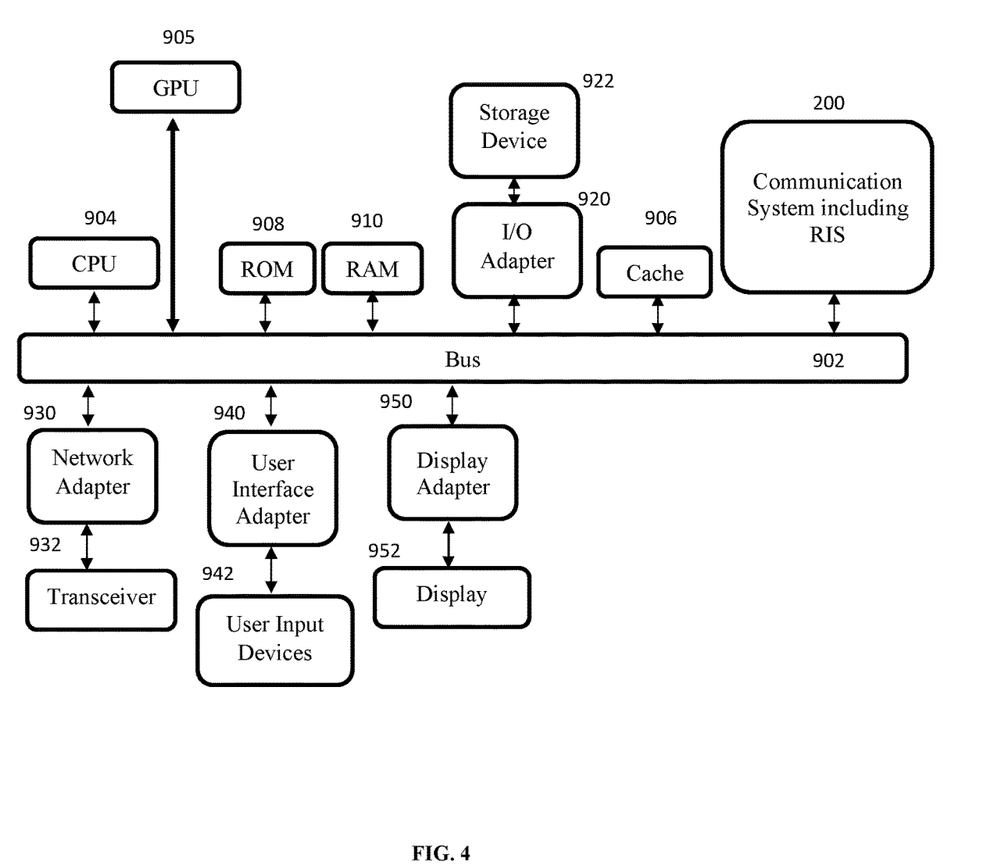
FIG. 4 is an exemplary processing system for shaping a mmWave wireless channel in a wireless network, in accordance with embodiments of the present invention.

FIG. 4 is an exemplary processing system for shaping a millimeter wave (mmWave) wireless channel in a wireless network, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the communication system 200 including the RIS 210 is electrically connected thereto.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
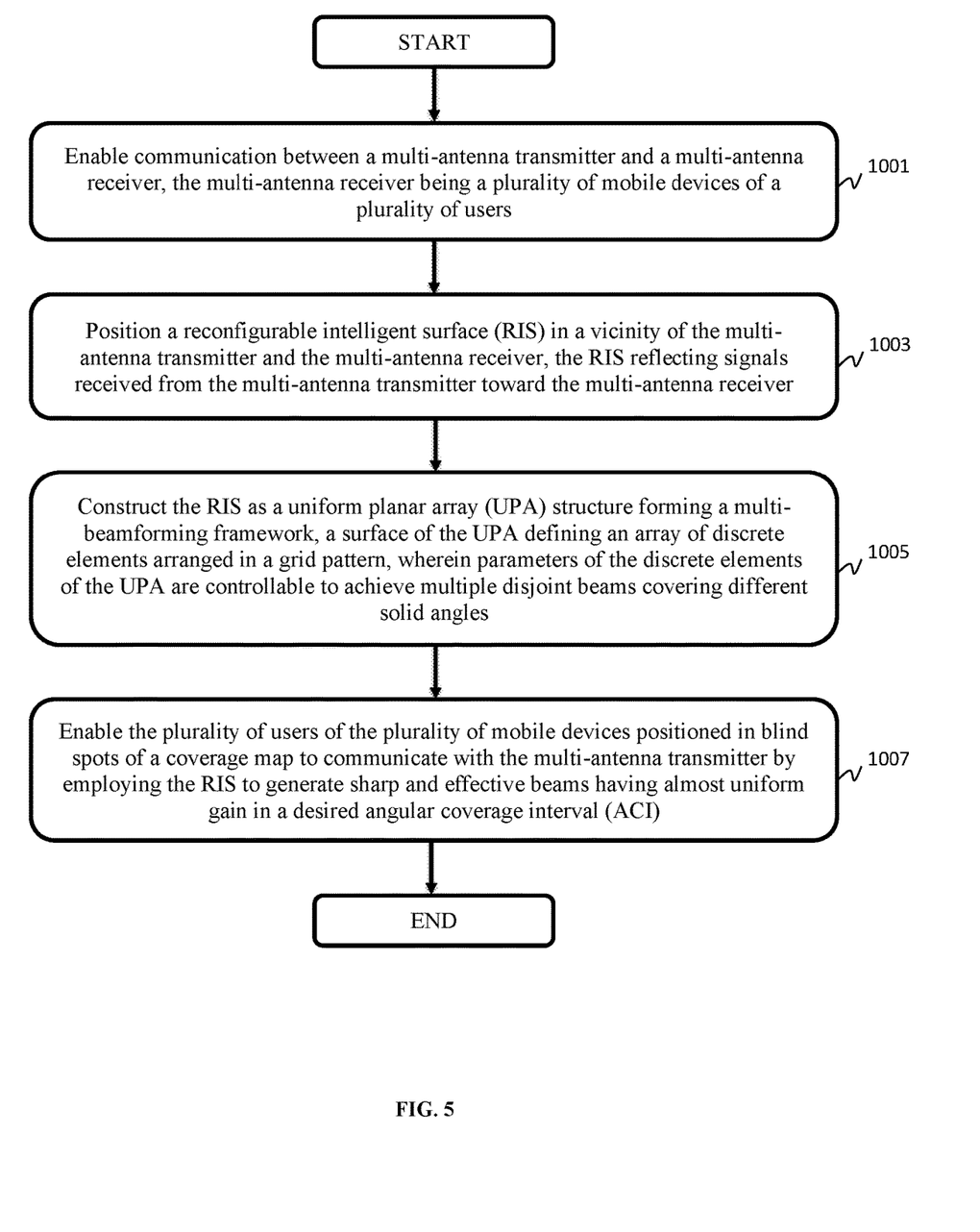
FIG. 5 is a block/flow diagram of an exemplary method for shaping a mmWave wireless channel in a wireless network, in accordance with embodiments of the present invention.

FIG. 5 is a block/flow diagram of an exemplary method for shaping a millimeter wave (mmWave) wireless channel in a wireless network, in accordance with embodiments of the present invention.

At block 1001, enable communication between a multi-antenna transmitter and a multi-antenna receiver, the multi-antenna receiver being a plurality of mobile devices of a plurality of users.

At block 1003, position a reconfigurable intelligent surface (RIS) in a vicinity of the multi-antenna transmitter and the multi-antenna receiver, the RIS reflecting signals received from the multi-antenna transmitter toward the multi-antenna receiver.

At block 1005, construct the RIS as a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles.

At block 1007, enable the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for shaping a millimeter wave (mmWave) wireless channel in a wireless network, the method comprising:

receiving signals at a reconfigurable intelligent surface (RIS) in a vicinity of a multi-antenna transmitter and a multi-antenna receiver the signals communicated between the multi-antenna transmitter and the multi-antenna receiver through the reconfigurable intelligent surface (RIS), the RIS being a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, the RIS reflecting the signals received from the multi-antenna transmitter toward the multi-antenna receiver; and and enabling the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

2. The method of claim 1, wherein channel matrices of each discrete element of the UPA of the RIS are given as:

$H_t = d_{M_t}\{\Omega_t\} \rho_t d_M^H\{\Omega_1\}$, and $H_r = d_M\{\Omega_2\} \rho_r d_{M_r}^H\{\Omega_r\}$, where $\Omega_1$, $\Omega_2$ are solid angles of departure (AoD) of beams transmitted from the multi-antenna transmitter and the RIS, $\Omega_t$ and $\Omega_r$ are solid angles of arrival (AoA) of the beams received at the RIS and the multi-antenna receiver, respectively, a gain of the line-of-sight (LoS) paths from the transmitter to the RIS and from the RIS to the receiver are demoted by $\rho_t$ and $\rho_r$ respectively, and $d_{M_t}$, $d_M$, $d_M^H$, and $d_{M_r}^H$ and denotes various directivity vectors defining distances between the discrete elements of ti UPA of the RIS.

3. The method of claim 1, wherein a beamforming vector is defined as:

$$c = \left[ c_{0,0}, \ldots, c_{0,M_h-1}, c_{1,0}, \ldots, c_{M_v-1,M_h-1} \right]$$

wherein values of phase shift $\theta_k$ and attenuation value $\beta_k$ for the $k^{th}$ elements of the RIS are found by using corresponding beamforming coefficient $c_k$ and a value of the $k^{th}$ element of a directivity vector $d_M(\Omega_1)$ for any receive incident solid an $\Omega_1$.

4. The method of claim 1, wherein the sharp and effective beams depend on solid angles at which incident waves from the multi-antenna receiver activate the discrete elements of the UPA.

5. The method of claim 1, wherein the RIS is a passive RIS where both phase control and gain control are permitted.

6. The method of claim 1, wherein values for a phase shift and an attenuation value of the MS are determined by using corresponding beamforming coefficients and a value of a kth element of a directivity vector for any receive incident solid angle.

7. The method of claim 1, wherein the multi-beamforming framework is designed as an optimization problem.

8. A non-transitory computer-readable storage medium comprising a computer-readable program for shaping a millimeter wave (mmWave) wireless channel in a wireless network, wherein the computer-readable program when executed on a computer causes the computer to perform the steps of:

receiving signals at a reconfigurable intelligent surface (RIS) in a vicinity of a multi-antenna transmitter and a multi-antenna receiver to communicate between the multi-antenna transmitter and the multi-antenna receiver through the reconfigurable intelligent surface (RIS), the RIS being a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, the RIS reflecting the signals received from the multi-antenna transmitter toward the multi-antenna receiver; and enabling the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

9. The non-transitory computer-readable storage medium of claim 8, wherein channel matrices of each discrete element of the UPA of the RIS are given as:

$$H_t = d_{M_t}\{\Omega_t\}\rho_t d_M^H\{\Omega_1\}, \text{ and}$$

$$H_r = d_M\{\Omega_2\}\rho_r d_{M_r}^H\{\Omega_r\},$$

where $\Omega_1$ and $\Omega_2$ are solid angles of departure (AoD) of beams transmitted from the multi-antenna transmitter and the RIS, $\Omega_t$ and $\Omega_r$ are solid angles of arrival (AoA) of the beams received at the RIS and the multi-antenna receiver, respectively, a gain of the line-of-sight (LOS) paths from the transmitter to the RIS and from the RIS to the receiver are denoted by $\rho_t$ and $\rho_r$, respectively, and $d_{M_t}$, $d_M$, $D_M^H$, and $d_{M_r}^H$ denotes various direct v ty vectors defining distances between the discrete elements of the UPA of the RIS.

10. The non-transitory computer-readable storage medium of claim 8, wherein a beamforming vector is defined as:

$$c = [c_{0,0}, \ldots, c_{0,M_h-1}, c_{1,0}, \ldots, c_{M_v-1,M_h-1}]$$

wherein values of phase shift $\theta_k$ and attenuation value $\beta_k$ for the $k^{th}$ elements of the IRIS are found by using corresponding beamforming coefficient $c_k$ and a value of the $k^{th}$ element of a directivity vector $d_M\{\Omega_1\}$ for any receive incident solid angle $\Omega_1$.

11. The non-transitory computer readable storage medium of claim 8, wherein the sharp and effective beams depend on solid angles at which incident waves from the multi-antenna receiver activate the discrete elements of the UPA.

12. The non-transitory computer-readable storage medium of claim 8, wherein the RIS is a passive RIS where both phase control and gain control are permitted.

13. The non-transitory computer-readable storage medium of claim 8, wherein values for a phase shift and an attenuation value of the RIS are determined by using corresponding beamforming coefficients and a value of a kth element of a directivity vector for any receive incident solid angle.

14. The non-transitory computer-readable storage medium of claim 8, wherein the multi-beamforming framework is designed as an optimization problem.

15. A system for shaping a millimeter wave (mmWave) wireless channel in a wireless network, the system comprising:

a memory; and one or more processors in communication with the memory configured to:

receive signals at a reconfigurable intelligent surface (RIS) in a vicinity of a multi-antenna transmitter and a multi-antenna receiver to communicate between the multi-antenna transmitter and the multi-antenna receiver through the configurable intelligent surface (RIS), the RIS being a uniform planar array (UPA) structure forming a multi-beamforming framework, a surface of the UPA defining an array of discrete elements arranged in a grid pattern, wherein parameters of the discrete elements of the UPA are controllable to achieve multiple disjoint beams covering different solid angles, the RIS reflecting the signals received from the multi-antenna transmitter toward the multi-antenna receiver; and enable the plurality of users of the plurality of mobile devices positioned in blind spots of a coverage map to communicate with the multi-antenna transmitter by employing the RIS to generate sharp and effective beams having almost uniform gain in a desired angular coverage interval (ACI).

16. The system of claim 15, wherein channel matrices of each discrete element of the UPA of the RIS are given as:

$$H_t = d_{M_t}\{\Omega_t\}\rho_t d_M^H\{\Omega_1\}, \text{ and}$$

$$H_r = d_M\{\Omega_2\}\rho_r d_{M_r}^H\{\Omega_r\},$$

where $\Omega_r$ and $\Omega_2$ fat are solid angles of departure (AoD) of beams transmitted from the multi-antenna transmitter and the RIS, $\Omega_1$ and $\Omega_r$ are solid angles of arrival (AoA) of the beams received at the RIS and the multi-antenna receiver, respectively, a gain of the line-of-sight (LoS) paths from the transmitter to the RIS and from the RIS to the receiver are denoted by $\rho_t$ and $\rho_r$, respectively, and $d_{M_t}$, $d_M$, $d_M^H$, and $d_{M_r}^H$ denotes various directivity vectors defining distances between the discrete elements of the UPA of the RIS.

17. The system of claim 15, wherein a beamforming vector is defined as:

$$c = [c_{0,0}, \ldots, c_{0,M_h-1}, c_{1,0}, \ldots, c_{M_v-1,M_h-1}]$$

wherein values of phase shift $\theta_k$ and attenuation value $\beta_k$ for the $k^{th}$ elements of the RIS are found by using corresponding beamforming coefficient $c_k$ and a value of the $k^{th}$ element of directivity vector $d_M\{\Omega_1\}$ for any receive incident solid angle $\Omega_1$.

18. The system of claim 15, wherein the sharp and effective beams depend on solid angles at which incident waves from the multi-antenna receiver activate the discrete elements of the UPA.

19. The system of claim 15, wherein the RIS is a passive RIS where both phase control and gain control are permitted.

20. The system of claim 15, wherein values for a phase shift and an attenuation value of the RIS are determined by using corresponding beamforming coefficients and a value of a kth element of a directivity vector for any receive incident solid angle.

* * * * *